United States Patent
Sakakura

(10) Patent No.: US 7,254,400 B1
(45) Date of Patent: Aug. 7, 2007

(54) WIRELESS TERMINAL COMMUNICATION METHOD

(75) Inventor: Takashi Sakakura, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 1112 days.

(21) Appl. No.: 09/679,816

(22) Filed: Oct. 5, 2000

(30) Foreign Application Priority Data

Oct. 14, 1999 (JP) .................. 11-291847

(51) Int. Cl.
*H04Q 7/20* (2006.01)
(52) U.S. Cl. .............. 455/456.1; 455/456.2; 455/456.5; 455/456.6; 455/435.1
(58) Field of Classification Search ........... 455/433, 455/456, 435, 517, 445, 456.1, 456.5, 456.3, 455/456.6, 41.2, 435.1, 435.2, 435.3, 456.2; 370/315, 349, 397, 409, 410
See application file for complete search history.

(56) References Cited

U.S. PATENT DOCUMENTS

| | | | |
|---|---|---|---|
| 5,822,309 A * | 10/1998 | Ayanoglu et al. | |
| 5,987,011 A * | 11/1999 | Toh | |
| 6,069,588 A * | 5/2000 | O'Neill, Jr. | 455/561 |
| 6,138,003 A * | 10/2000 | Kingdon et al. | 455/410 |
| 6,317,605 B1 * | 11/2001 | Sakuma | |
| 6,351,647 B1 * | 2/2002 | Gustafsson | 455/466 |
| 6,470,447 B1 * | 10/2002 | Lambert et al. | |
| 6,477,581 B1 | 11/2002 | Carpenter et al. | |
| 6,574,266 B1 * | 6/2003 | Haartsen | 455/434 |
| 6,742,037 B1 * | 5/2004 | Hall et al. | 709/228 |
| 6,789,057 B1 * | 9/2004 | Morimoto et al. | 704/2 |

FOREIGN PATENT DOCUMENTS

| | | |
|---|---|---|
| JP | 07-162935 A | 6/1995 |
| JP | 10-145276 A | 5/1998 |
| JP | 10-145840 A | 5/1998 |
| JP | 10-221106 | 8/1998 |
| JP | 10-248088 A | 9/1998 |
| JP | 11-122655 A | 4/1999 |
| JP | 11-163875 | 6/1999 |

OTHER PUBLICATIONS

Patent Abstracts of Japan, Appln. No. 09-325722, Pub. No. 11-163875, Date of Publication of Application Jun. 18, 1999.

* cited by examiner

*Primary Examiner*—Joseph Feild
*Assistant Examiner*—Huy D Nguyen
(74) *Attorney, Agent, or Firm*—Birch, Stewart, Kolasch & Birch, LLP

(57) ABSTRACT

The present invention aims to perform communication between the wireless terminals by adopting the existing networks and by avoiding the congestion on the network. The terminal location databases set at various networks control the position information of the wireless terminals. According to one of the steps in the method of the present invention, a wireless terminal inquires a terminal location database for the position information of a destination wireless terminal. Then, as for the next step, the wireless terminal receives a reply from the terminal location database regarding the position information of the destination wireless terminal. As for the following step, the wireless terminal communicate to the destination wireless terminal.

17 Claims, 14 Drawing Sheets

Fig. 4 A

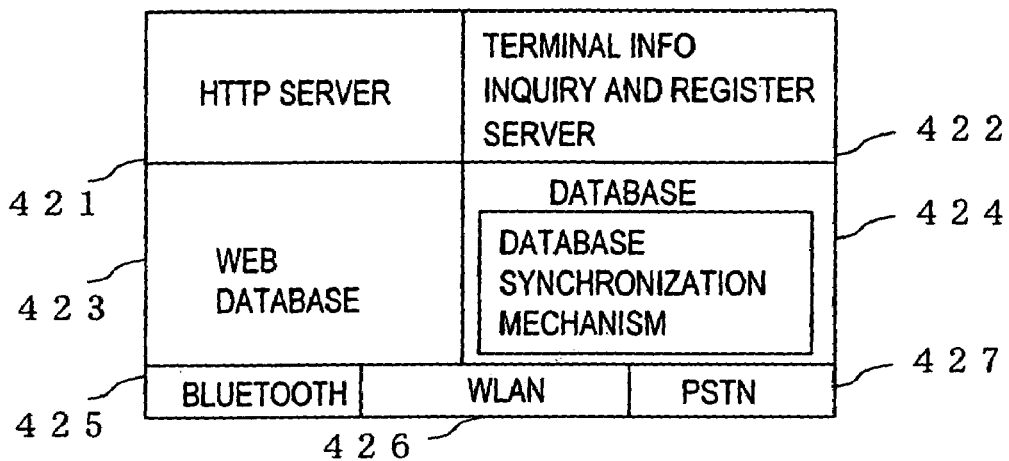

| HTTP SERVER | TERMINAL INFO INQUIRY AND REGISTER SERVER |
| --- | --- |
| WEB DATABASE | DATABASE |
| | DATABASE SYNCHRONIZATION MECHANISM |
| BLUETOOTH | WLAN | PSTN |

| Node ID; mobile1.isl.melco.co.jp | |
| --- | --- |
| Position | 35.21.2.807N 139.32.4.821E |
| | Cell Type 1;kanagawa.kamakura.ofuna.bs1 |
| | ⋮ |
| Status; active | |
| Resources | HTTP |
| | FTP |
| | DataStore; schedule |
| | DataStore; inventory |
| | Directry Database |
| | ⋮ |
| Comm Devices | Cell Type1; 0921894198; |
| | Wireless LAN; 3a5bab842c; repoff |
| | Bluetooth;;repoff |
| | ⋮ |

| | | |
|---|---|---|
| mobile1.isl.melco.co.jp | Wireless LAN; 3a5bab842c; repoff | 1202 |
| mobile5.isl.melco.co.jp | Wireless LAN; bc123ab842; repon | 1203 |
| mobile8.isl.melco.co.jp | Wireless LAN; 3a5325842c; repon | 1204 |
| mobile2.isl.melco.co.jp | Wireless LAN; 3a5bab8443; repoff | |

1201

WIRELESS TERMINAL COMMUNICATION METHOD

BACKGROUND OF THE INVENTION

1. Field of the Invention

The present invention relates to a communication method of a wireless terminal communicating to a desired wireless terminal. Both wireless terminals are situated under the same wireless communication environment.

2. Description of the Related Arts

Rapidly increasing uses of the cellular communication networks for the purposes of various data communication have been brought about from a recent advancement in their variety of types. Uses of these cellular communication networks continue to accelerate owing to the introduction of such services as cellular phone service that can have the internet connection and communication service that makes the high-speed delivery of the data possible. In addition to the ever increasing uses of these services which are provided by the operators, even the contents of these services are becoming diverse. A service which supplies the position information of a wireless terminal to a user of the network side and passes it onto another wireless terminal is one example of the diversified services. The example of such services are the service of supplying a timetable of the nearby train station to a wireless terminal based on its position information: and a service of locating the positions of the employees. Japanese unexamined patent publication HEI 10-221106 discloses a technique of informing the network user the position information of the wireless terminals using the internet. This technique is commonly being adopted for a purpose of controlling the positions of the wireless terminals.

As mentioned briefly, various types of the cellular communication networks provided and controlled by the operators are used by various wireless terminals for the purposes of various kinds of data communication. These data communication are the wireless communication from a wireless terminal to a cellular communication network, and vice versa, in other words, the wireless communication involving the operator. In the wireless communication involving the operator, it is the network who supplies the wireless communication mechanisms to the wireless terminal. Not only the wireless communication involving the operator supplying the wireless communication mechanism to the wireless terminal, but also other kinds of wireless communication which is the wireless communication not involving the operator, are becoming widespread. The wireless communication not involving the operator is the wireless communication from a wireless terminal to another wireless terminal. In this case, the wireless communication mechanisms are integrated to the wireless terminal. As an example, the communication method known as infrared data access (IrDA) interface exchanges data between one wireless terminal and another wireless terminal. The infrared data access integrates the wireless communication mechanisms to the wireless terminals. The communication method known as Bluetooth utilizes a high-speed and weak micro wave. The Bluetooth is a communication method from a wireless terminal to a well-known destination wireless terminal. The communication method known as wireless local area network is disclosed in Japanese unexamined patent publication HEI 11-163875. The wireless local area network (wireless LAN) implements the ad hoc network integrating media access control (MAC) to the wireless communication media. This publication discloses the wireless local area network system which deploys a mechanism to register position of a wireless terminal, to give a specific example, this technology is adopted in such locality as art museum, supplying an information to a user holding a wireless terminal, and the system supplies the information on any piece of artwork responding to position of the user holding the wireless terminal in the art museum.

Accordingly, various wireless communication mechanisms are beginning to be integrated to the wireless terminals making them possible to communicate from one wireless terminal to another wireless terminal without involving the operator in its way. Yet still, the mechanisms supplied by the operators allow the users to connect to the network to receive many different kind of services, however, the disadvantages in using their mechanisms are that the users are charged for using these services and also charged for the connection fee. With the increasing number of users using these services, without doubt this will cause a significant amount of communication traffics such that the operators also need more money to reinvest in the new equipment. Not to mention the fact that the wireless communication involving the operator is generally slow in speed. Thus, without doubt that the communication from one wireless terminal to another wireless terminal bypassing the operators such as in public switched telephone network is not at all practical.

On the other hand, the wireless communication not involving the operator is used in a fixed communication from one wireless terminal to another well-known destination wireless terminal using a weak radio wave in a narrow region. This can generally attain the high-speed communication rate. According to one of the aims of the present invention, not only it attempts to solve the pre-mentioned problems, but the present invention also aims to supply the data communication method between the wireless terminals integrating the data communication mechanisms by forming what is essentially a contingent and local network (ad hoc network). In precise terms, the present invention attempts to carry out a service to the wireless terminal by adopting a part of the existing network, setting up a terminal location database having various types of information, and further forming the ad hoc network consisting of wireless terminals, joining any wireless terminals to the ad hoc network formed, and allowing free communication between the joined wireless terminals. This way, even if the communication device in use such as wireless terminal which does not wish to involve the operator, the wireless terminal user can still search and inquire for a service or data provided by the operator, and in response to the inquiry of this wireless terminal, any other wireless terminal user who happens to have the service or the data being requested can send them instead. The application for which its use is limited to a business card exchanges between the wireless terminals is adopted and extended to the extent of exchanging of non-specified amount of services and data. This enables the wireless terminal to utilize the high-speed wireless communication to the unknown wireless terminal at a reasonable cost.

SUMMARY OF THE INVENTION

According to one aspect of the present invention, a wireless terminal communication method in a network comprises: a plurality of wireless terminals; and a terminal location database for controlling the position information of the wireless terminals. The wireless terminal communication method comprises the following steps: a step of inquiring to the terminal location database by a wireless terminal for a position information of a destination wireless terminal of the wireless terminal; and a step of communicating with the destination wireless terminal when the wireless terminal has received the position information of the destination wireless terminal from the terminal location database.

According to another aspect of the present invention, the wireless terminal communication method further comprises a step of broadcasting periodically a position and address of the terminal location database by the terminal location database. The wireless terminal makes an inquiry to the terminal location database based on the broadcast position and address.

According to another aspect of the present invention, a wireless terminal communication method in a network comprises: a plurality of wireless terminals; and a terminal location database for controlling the position information of the wireless terminals. The wireless terminal communication method comprises the following steps: a step of broadcasting periodically a position and address of the terminal location database by the terminal location database; and a step of communicating with the destination wireless terminal based on the broadcast position and address.

According to another aspect of the present invention, the wireless terminal communication method includes the terminal location database which replies pending to the inquiring step to the terminal location database by the wireless terminal unless the destination wireless terminal is registered. Then, the terminal location database replies to the inquiry after the destination wireless terminal enters and registers the desired position.

According to another aspect of the present invention, the wireless terminal communication method includes the wireless terminal which determines a priority order of the inquiries, and then sends the inquiring step according to the priority order.

According to another aspect of the present invention, the wireless terminal communication method includes the terminal location database which searches for an intermediate terminal to the inquiring step unless the direct communication between the wireless terminal and the destination wireless terminal is possible, and then replies to the inquiring step to the terminal location database including the name of the searched intermediate terminals to the wireless terminal.

According to another aspect of the present invention, the wireless terminal communication method includes the terminal location database which sets up a route information. The wireless terminal communication method further comprises a step of sending the route information to the intermediate terminals.

According to another aspect of the present invention, the wireless terminal communication method further comprises a step of exchanging periodically the position information of the wireless terminals by the terminal location database.

According to another aspect of the present invention, the wireless terminal communication method includes the terminal location database which has an address and an ad hoc wireless network interface, and then connects to the ad hoc wireless network.

According to another aspect of the present invention, the wireless terminal communication method further comprises a step of notifying to the other terminal location database who can respond to the inquiry after the terminal location database receives an inquiry regarding a relevant information from the wireless terminal. The wireless terminal communication method includes the wireless terminal which makes an inquiry to the other terminal location database based on this notification of the position of the other terminal location database.

According to another aspect of the present invention, the wireless terminal communication method includes the terminal location database which refers and replies to the inquiring step the position information of the wireless terminals controlled by the cellular phone network.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention, and wherein:

FIG. 4 B illustrates an example data of the terminal location database;

FIG. 4 C illustrates a flow diagram of the terminal location database control device;

FIG. 8 B illustrates a software configuration of the roadside communication device with the terminal location database;

FIG. 9 B illustrates flow diagram of the roadside communication device of the embodiment 3;

FIG. 12 illustrates an example of the route information for the embodiment 6;

FIG. 13 B illustrates a flow diagram of the terminal location database control device for the embodiment 6.

DETAILED DESCRIPTION OF THE PREFERRED EMBODIMENTS

Figure 1:
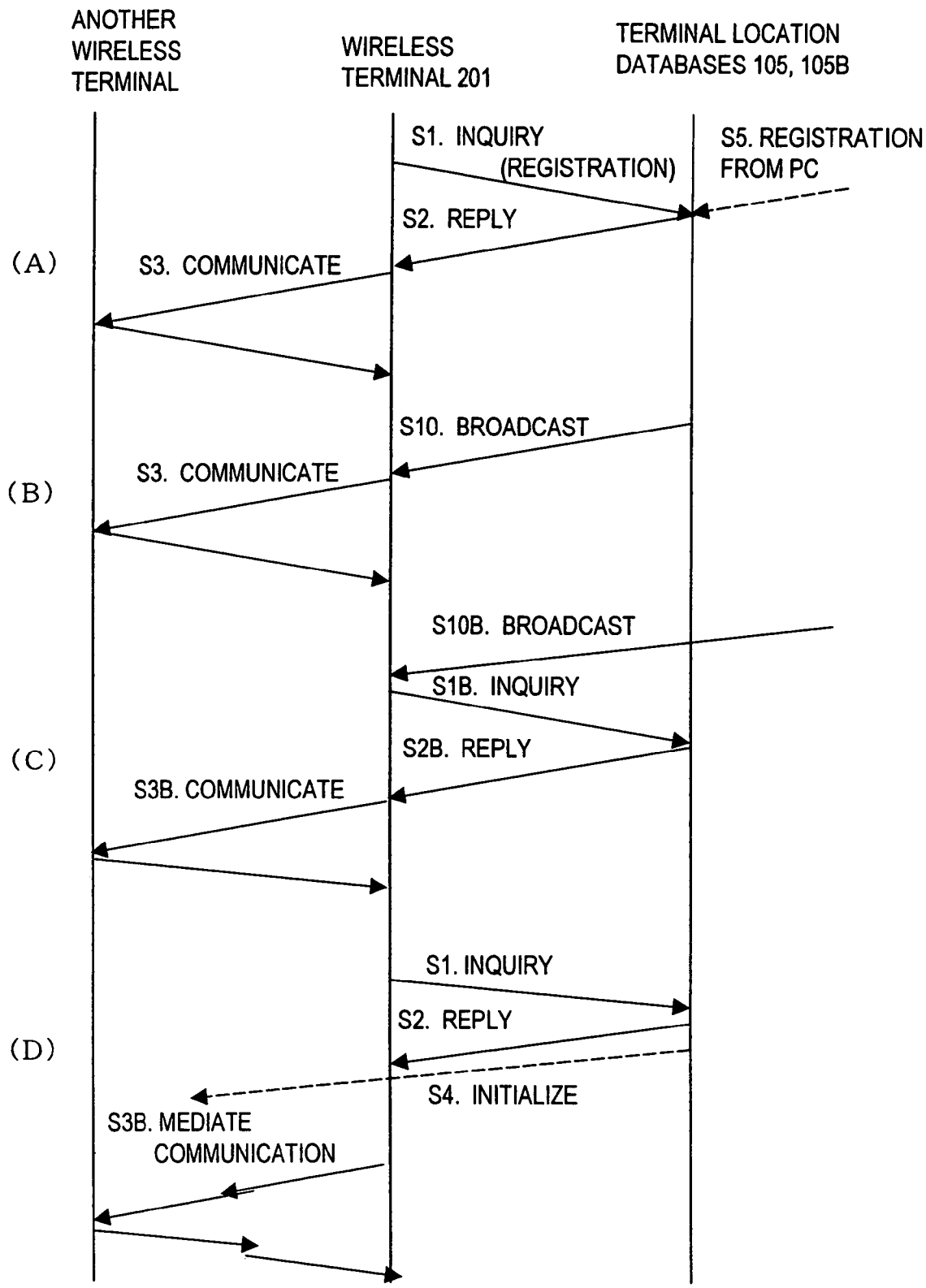
FIG. 1 illustrates the communication methods conducted by the preferred system of the present invention in sequential steps.

Reference will now be made in detail to the present preferred embodiments of the invention, examples of which are illustrated in the accompanying drawings, wherein like reference numerals indicate like elements throughout the several views.

Embodiment 1

The basic configuration and operation of the preferred system of the present invention is described with reference to the drawings.

Figure 2:
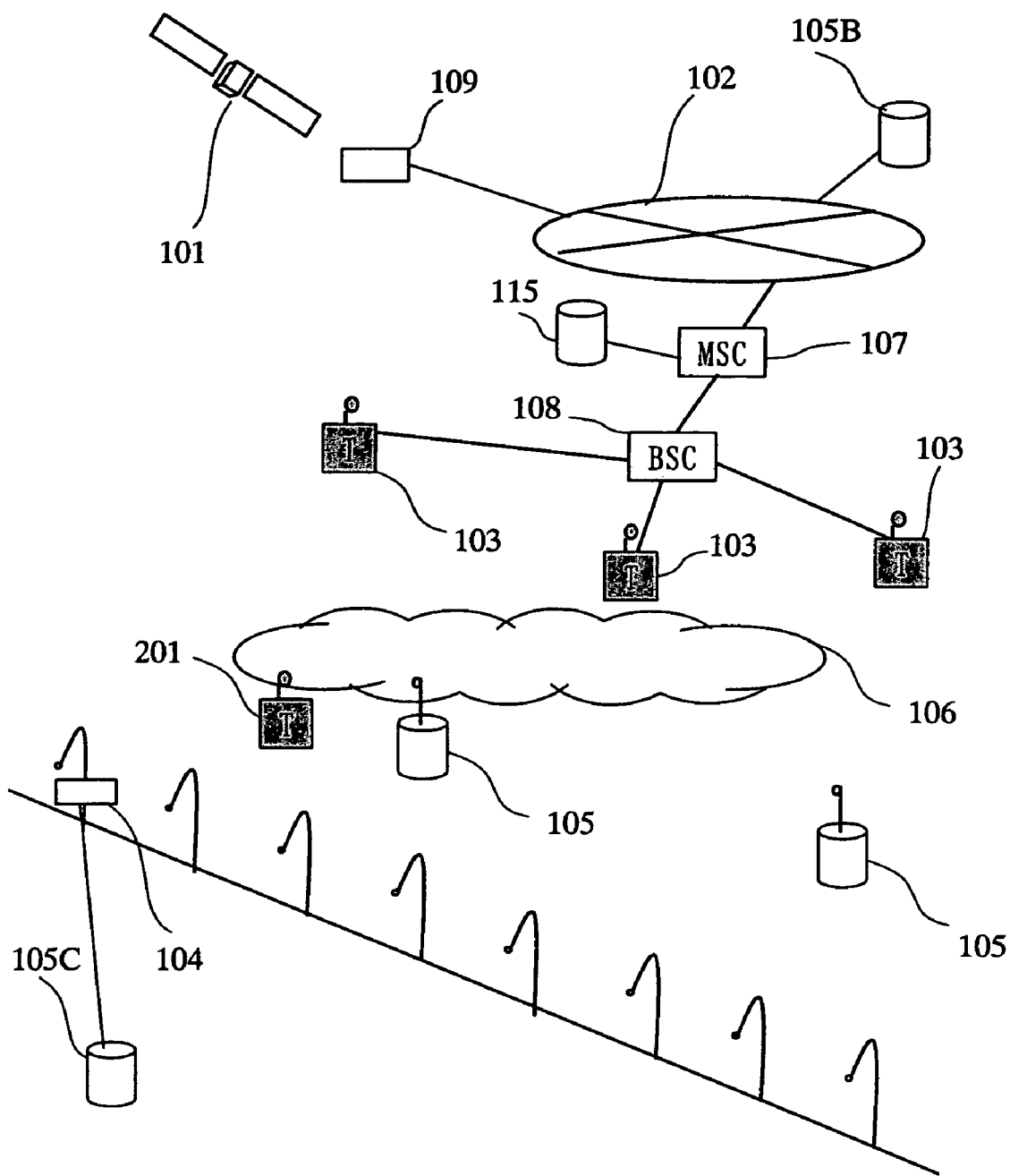
FIG. 2 illustrates a system for the communication methods of the present invention.
Figure 3:
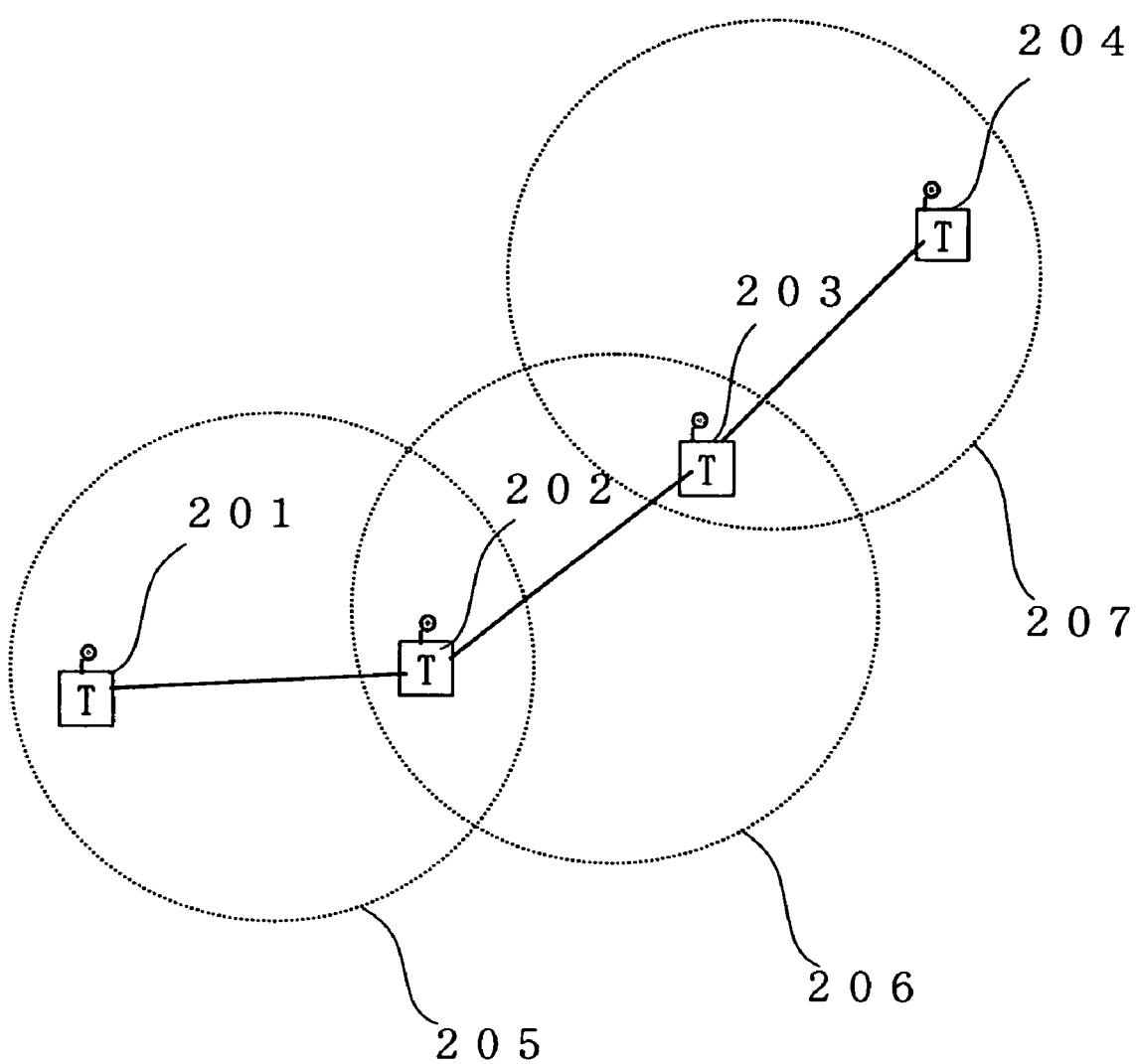
FIG. 3 illustrates a formation of ad hoc wireless network and communication via the intermediate terminals.
Figure 4:
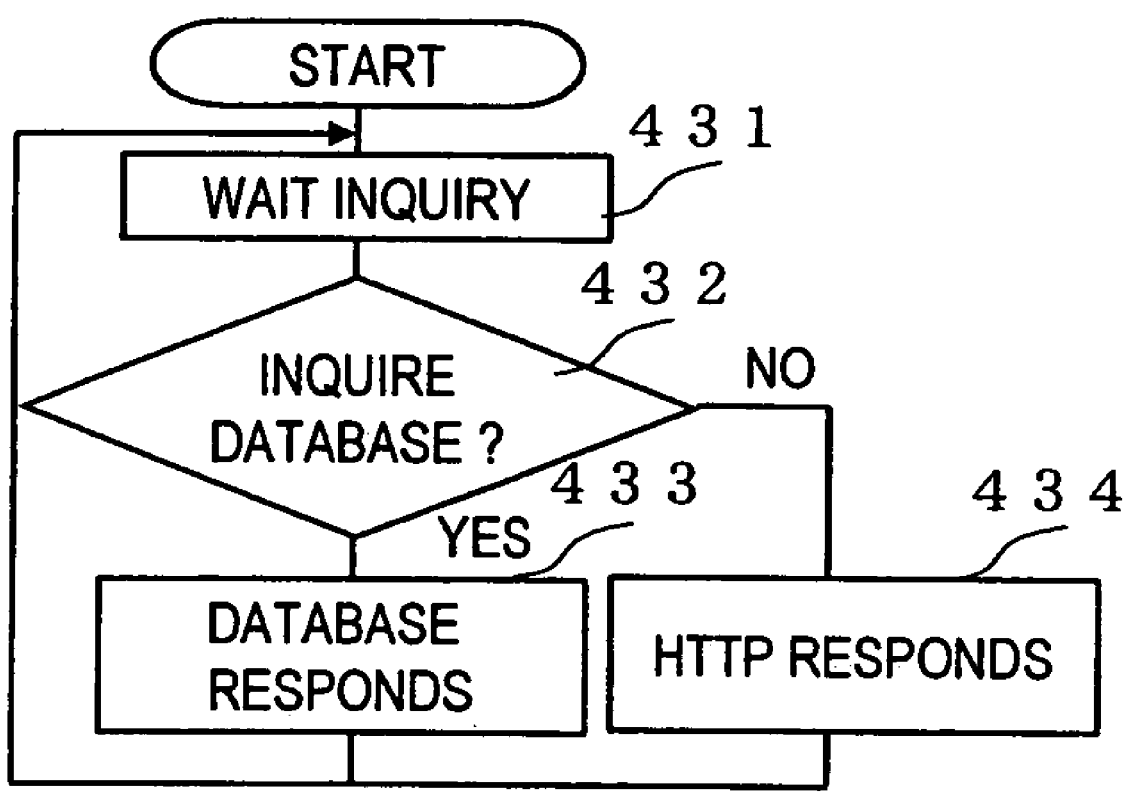
FIG. 4 A illustrates one example of the configuration and operation of the terminal location database.
Figure 5:
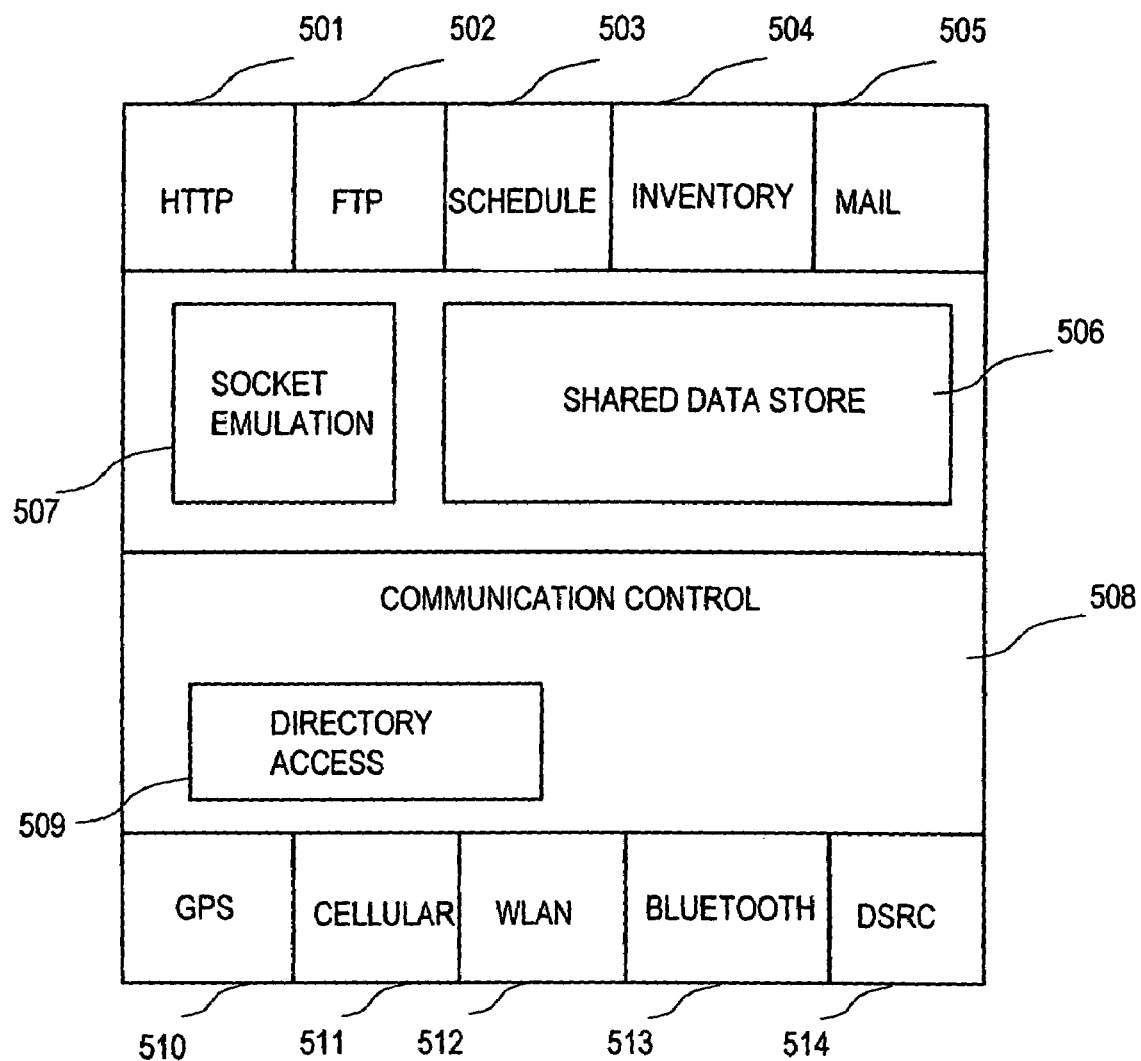
FIG. 5 illustrates a software configuration of the wireless terminal for the embodiment 1.
Figure 6:
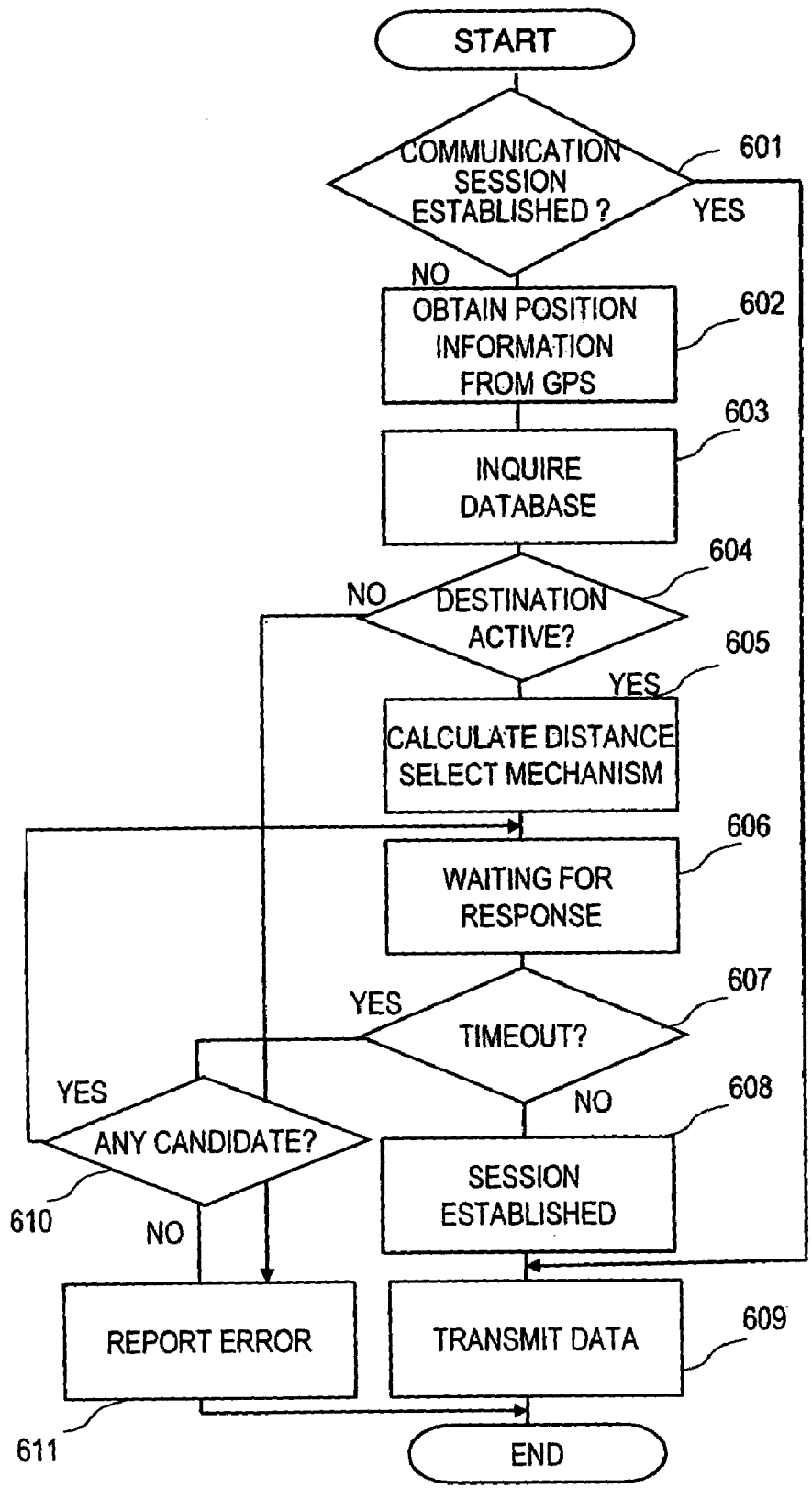
FIG. 6 illustrates a flow diagram of the operation conducted by the wireless terminal.

The drawing of FIG. 1 illustrates the communication methods of the present embodiment shown in sequential steps. The drawing of FIG. 2 illustrates the wireless communication system of the present embodiment. The drawing of FIG. 3 illustrates the formation of the ad hoc wireless network. FIG. 3 also illustrates terminals (or nodes) communicating from one terminal to another terminal via the intermediate terminals. The drawing of FIG. 4 A illustrates one example of the software configuration. FIG. 4 B illustrates an example of data of the terminal location database. FIG. 4 C illustrates the flow diagram of the terminal location database control device. The terminal location database and the control device are the key feature of the present invention. The drawing of FIG. 5 illustrates one example of the software configuration of the wireless terminal. The drawing of FIG. 6 illustrates the flow of operation conducted by the wireless terminal.

The terminal location databases 105, 105B, and 105C shown in FIG. 2 are connected and set to the following networks: the public switched telephone network; the ad hoc wireless network; the internet; and the intelligent transport system (ITS) network. Positions of these terminal location databases 105, 105B, and 105C are also notified to the wireless terminals by the communication satellite. For instance, the terminal location database illustrated in the example of FIG. 4 B stores and controls the following information: up-to-date position information of the wireless terminals, operation status of the wireless terminals, resources being stored at the wireless terminals, relevant service information, and information related to valid communication media.

The reference numeral 101 in FIG. 2 denotes a communication satellite. The communication satellite notifies the position of the terminal location database to the wireless terminals. The communication via the satellite takes higher latency but the satellite can cover a wide area. The reference numeral 102 in FIG. 2 denotes the public switched telephone network. The reference numerals 103 denote the wireless base stations. A wireless base station 103 connects a wireless terminal 201 and the public switched telephone network 102. The wireless base stations 103 and the public switched telephone network 102 can be connected to the internet. A wireless base station 103 can cover a communication range ranging from a few kilometers to several hundreds of meters. Its capacity depends on the method of the wireless base station 103. Two wireless base stations 103 are provided with the control mechanism such as communication handoff mechanism. The wireless base station 103 conducts the notification service of the current position of the terminal location database to the users of the wireless terminals 201, 202, 203, and 204. The reference numeral 104 denotes a transmitting unit and receiving unit of the intelligent transport system which are placed alongside the road in the dedicated short range communications (DSRC). The reference numeral 106 denotes the ad hoc wireless network.

The reference numerals 105, 105B, and 105C are the terminal location databases which are the most important components of the system. Wireless terminals know the addresses of these terminal location databases. Either that or the position of the terminal location databases are broadcast to the wireless terminals via the wireless base station 103. Depending on the system, the wireless base station 103 replies to general inquiries from the wireless terminals regarding the position of the terminal location database by sending them the information being requested. And of course, the wireless base station 103 may be combined to the terminal location database 105B. The reference numeral 107 is a mobile network switching center. The reference numeral 108 is a base station controller. The reference numeral 109 is a communication satellite base station. The reference numeral 115 is a home location register.

The wireless terminal has functions to communicate via the satellite, via the wireless communication range, via the intelligent transport system network, and via the public switched telephone network as illustrated in FIG. 2. However, not all of the wireless terminals are geared to have all of these functions. For instance, some wireless terminals may not have the function to communicate via the satellite. For those wireless terminals not having the function to communicate with the satellite, they select the communication destination wireless terminal according to the flow of FIG. 6. Note that such wireless terminals simply do not have the function to communicate via the satellite only but they may have functions to communicate via other networks shown in FIG. 2.

FIG. 3 illustrates an example of forming the ad hoc wireless network by using the wireless communication devices of low output. The reference numerals 201, 202, 203, and 204 denote the wireless terminals provided with the wireless communication devices. The reference numerals 205, 206, and 207 indicate the wireless communication range of the wireless communication devices. A wireless terminal in a certain wireless communication range can communicate with another wireless terminal as long as they are in the same wireless communication range. So, in order for the wireless terminal to communicate to another wireless terminal outside the wireless communication range, other wireless terminals must mediate the communication. It is the wireless communication device of each wireless terminal which mediates such communication by providing a route information. In precise terms, the wireless terminal 201 connects to the wireless terminal 202 within its same wireless communication range, and the wireless terminal 202 connects to the wireless terminal 203 within its same wireless communication range, and the wireless terminal 203 connects to the wireless terminal 204 within its same wireless communication range. This way, the wireless terminal 201 can be connected to the wireless terminal 204 which is a desired connection destination via the intermediate wireless terminals 202 and 203.

Operation of the wireless terminal 201 communicating to another wireless terminal at the previously described system configuration will now be explained.

On the premise that all of the wireless terminal position information (see FIG. 4 B) are registered and stored in the terminal location database 105, a personal computer (not illustrated) notifies this registration to the terminal location database 105 at step S5 of FIG. 1. Alternatively, these position information can be registered to the terminal location database 105 directly by the wireless terminals at step S5 of FIG. 5. In the terminal location databases 105 and 105B, one record each is allocated to every wireless terminals. The terminal location databases 105 and 105B update and control these records. In specific terms, the terminal location databases 105 and 105B update the position information of the moving wireless terminals. Also, the terminal location databases 105 and 105B reply to the inquiries coming from the other wireless terminals.

The wireless terminal 201 intends to communicate with the another wireless terminal. In step S1, the wireless terminal 201 inquires to the terminal location database including the database control device 105B. The terminal location database 105B knows the address of the wireless terminal 201. In step S2, the terminal location database including the database control device 105B refers to its control information of FIG. 4 (B). In step S2, the terminal location database 105B replies to the inquiry from the wireless terminal 201 via the wireless base station 103. In step S3, based on the position information of the another wireless terminal received from the terminal location database 105B via the wireless base station 103, the wireless terminal 201 directly communicates to the another wireless terminal. Note that the position information of the wireless terminal 201 may be registered to the terminal location database 105B at the same time as the inquiring step S1.

The reference numeral 401 in FIG. 4 B denotes the node identification (ID) information of, for example, the wireless terminal 201. This node ID information is expressed by the record allocated. In the present embodiment, the node ID information 401 is set according to the domain name system on the internet. The reference numerals 402 and 403 are the position information of the wireless terminal 201. The position information 402 and 403 are dynamically controlled. The position information 402 of the wireless terminal 201 is expressed using the latitude and longitude. The accuracy range of the position information 402 is two to three meters. The position information 402 and 403 are expressed up to the accuracy of one hundredth of a second. The position information 403 denotes a cell ID indicating that the wireless terminal 201 is situated inside the cell of a base station having the ID of "kanagawa.kamakura.ofuna.bs1" at a cellular system called "Cell Type 1". Also, when the terminal location database 105B obtains a new position information regarding this wireless terminal 201, then the new position information is added to the end of the position information list.

The reference numeral 404 expresses a status of this wireless terminal 201. In this example, the wireless terminal 201 is active. The reference numerals 405, 406, 407, and 408 are various services and data prepared at this wireless terminal 202. The reference numeral 405 indicates hyper text transfer protocol (HTTP) service. The reference numeral 406 indicates file transfer protocol (FTP) service. The reference numerals 407 and 408 are data sharing services which will be described later in this specification.

FIG. 5 illustrates a software configuration of the wireless terminal, for instance, the software of the wireless terminal 201. The wireless terminal 201 is expressed by the record indicated in FIG. 4 (B) in the terminal location database. The reference numerals 501, 502, 503, 504, and 505 denote applications that are usable by the wireless terminal 201. The reference numeral 501 denotes a server and client of the hyper text transfer protocol. The reference numeral 502 denotes a server and client of the file transfer protocol. The reference numeral 503 denotes a schedule control application which is sharing data among a plurality of wireless terminals. The reference numeral 504 denotes an inventory control application which is sharing data among the plurality of wireless terminals. The reference numeral 505 denotes an electronic mail client application. The reference numeral 506 denotes a shared data store mechanism for storing and controlling the shared data among the plurality of wireless terminals. The reference numeral 507 denotes an emulation code of the TCP/IP socket (or socket emulation mechanism) prepared for connecting to the application of TCP/IP base.

The reference numeral 508 denotes a communication control mechanism. The reference numeral 509 denotes the directory access. The communication control mechanism 508 uses the directory access 509 to control the communication from the application, and selects the best communication method. The reference numeral 510 denotes a global positioning system (GPS) mechanism for obtaining a highly precise position information. The reference numerals 511, 512, 513, and 514 are the wireless communication mechanisms prepared by the wireless terminal 201. The global positioning system mechanism 510 combines a satellite communication mechanism. The reference numeral 511 denotes the cellular phone network communication mechanism. The reference numeral 512 denotes the wireless local area network communication mechanism. The reference numeral 513 denotes the Bluetooth communication mechanism. The reference numeral 514 denotes the dedicated short range communication mechanism.

Let's assume a specific circumstance, which is the direct communication between the two wireless terminals. This is described with reference to the drawings of FIG. 4, FIG. 5, and FIG. 6.

The specific example is the direct communication between the wireless terminal 201 and the wireless terminal 202. Both wireless terminals have the same software configuration. This software is illustrated in FIG. 5. In this example, the wireless terminal 201 wishes to use the data of the wireless terminal 202. The terminal location database including the database control device 105B has a telephone number which is used at the public switched telephone network. Each wireless terminal can access to the terminal location database 105B which has the telephone number by using the global positioning system mechanism 510. This global positioning system mechanism 510 also has a function of communicating to the cellular phone network.

In this example, the user of the wireless terminal 201 wishes to exchange the inventory control data with the user of the wireless terminal 202. The user of the wireless terminal 201 is doing business activities together with the user of the wireless terminal 202. The user of the wireless terminal 201 performs an operation for making the data consistent at the operation screen of the inventory control application 504 of this wireless terminal 201. This inventory control application 504 commands the shared data store mechanism 506 to perform the data consistency recovering operation. At the same time, the node ID information "mobile2.isl.melco.co.jp" of the wireless terminal 202 is handed over to the shared data store mechanism 506. The shared data store mechanism 506 requests the communication control mechanism 508 to transmit an initial data to the wireless terminal 202.

The communication control mechanism 508 receives the request to transmit the initial data from the shared data store mechanism 506. Then, the communication control mechanism 508 performs the transmission process according to the flow chart of FIG. 6. In step 601, the communication control mechanism 508 refers to the control information of the wireless terminal 201 in the terminal location database 105B, and checks whether or not the communication session has been established with the wireless terminal 202. In this example, the wireless terminal 202 is specified. If the communication session has already been established, then in step 609 the data is transmitted via the established communication session.

If the communication session has not been established at all, then the communication control mechanism 508 tries to establish the session by performing process beyond step 602. In step 602, the communication control mechanism 508 obtains the latitude and longitude information of the terminal location database 105B from the global positioning system mechanism 510. In step 603, the communication control mechanism 508 inquires the terminal location database 105B via the directory access 509 while holding onto the node ID information of the wireless terminal 202 as of step S1 in FIG. 1. The directory access 509 will be described later in this specification. Based on the information contained in the inquiring message from the wireless terminal 201 to the terminal location database 105B, the terminal location database 105B updates the position information of the wireless terminal 201. The terminal location database 105B including the database control device updates the cell ID 403 if there was any change in the communication cell.

In step 604, the communication control mechanism 508 checks the status 404 of the wireless terminal 202 from a record of the wireless terminal 202, which is obtained by inquiring the terminal location database 105B as of step S2 in FIG. 1. If the status 404 is not active, then in step 611, finish the process by reporting an error. If the status 404 is active, then in step 605, the communication control mechanism 508 calculates the distance between the wireless terminals 201 and 202 by using the position information of the wireless terminal 202. Among from the communication possible mechanisms, the communication control mechanism 508 uses the directory access 509 to select the one having the fastest transferring rate. In step 606, the communication control mechanism 508 transmits the session begin message as of step S3 in FIG. 1 by using the selected communication mechanism. In step 607, the wireless terminal 201 waits for a response from the destination wireless terminal 202.

If there is a response from the wireless terminal 202 before timeout, then in step 608, the fact that the communication session is established is registered to the control information in the communication control mechanism 508 of the wireless terminal 201. If timeout, then the process of step 606 is repeated to the next candidate wireless terminal other than the wireless terminal 202. If the wireless terminal 201 fails to establish communication session with all of the candidate wireless terminals, then in step 611, report an error to finish the process.

The wireless terminal 201 has the node ID information of the destination wireless terminal 202. The wireless terminal 201 can access the information on all other wireless terminals in the communication region 205 by inquiring to the terminal location database 105B. Accordingly, the wireless terminal 201 is connected to the destination wireless terminal 202 by using the wireless local area network communication mechanism 512 or the communication mechanism by Bluetooth 513.

Furthermore, the wireless terminal 201 wants to obtain the regional information from the neighboring wireless terminal by using the hyper text transfer protocol. The user of the wireless terminal 201 goes through the browser software, and specifies "search nearby site" instead of the normal address specification by universal resource locator (URL). The browser software hands over the hyper text transfer protocol service, the current position, and communication distance as search keys to the communication control mechanism 508 of the wireless terminal 201, and requests the communication control mechanism 508 to search for the wireless terminal having the regional information. The communication control mechanism 508 utilizes the directory access 509 to inquire the terminal location database 105B in the similar manner as the step 603.

The terminal location database 105B receives the search keys. The terminal location database including the database control device 105B updates the data of FIG. 4 if the wireless terminal 201 have changed its current position. The terminal location database including the database control device 105B sets a specific region from the current position of the wireless terminal 201 and the size of its communication region. The terminal location database including the database control device 105B searches for a record representing a wireless terminal which is situated in the specific region, and which is supplying the hyper text transfer protocol service. The result of the search is returned to the wireless terminal 201. The communication control mechanism 508 of the wireless terminal 201 accumulates the records obtained from the terminal location database 105B. The records are sent by the terminal location database 105B and obtained by the wireless terminal 201 via the directory access 509. The communication control mechanism 508 displays on a screen of the wireless terminal 201 a list of the node ID information of the wireless terminals which are hit at the hyper text transfer protocol 501. The user can choose from the list for the wireless terminal for connecting using the hyper text transfer protocol.

Hyper text transfer protocol is a communication protocol on the TCP/IP. The hyper text transfer protocol 501 of the wireless terminal 201 receives an instruction from the user via the socket emulation mechanism 507. The hyper text transfer protocol 501 of the wireless terminal 201 instructs the communication control mechanism 508 to request for the hyper text transfer protocol connection with the chosen wireless terminal by specifying its ID information. The socket emulation mechanism 507 connects to the chosen wireless terminal by using the communication control mechanism 508. Then, according to the flow chart of FIG. 6, the chosen wireless terminal is connected. However, the inquiring to the terminal location database step of 603 is omitted in the case of hyper text transfer protocol connection. The socket emulation mechanism 507 attaches its header information to the message. The communication control mechanism 508 distributes the message attaching the header information to the socket emulation mechanism 507.

According to the present embodiment, those wireless terminals which could communicate with one another only if known by each other, and which could only be used locally are now possible for the direct communication with one another even if the wireless terminals are not known by each other, making them possible to use services and data of the unknown wireless terminal. This became possible in the present invention by providing the terminal location databases 105 and 105B and by implementing the inquiring step.

According to the present embodiment, the terminal location database containing the position information of the wireless terminals is set on the network. A wireless terminal comprises a step of inquiring the position information of a destination wireless terminal to the terminal location database when the inquiring wireless terminal wishes to communicate to the destination wireless terminal, and a step of communicating to the destination wireless terminal based on the reply from the terminal location database. The wireless terminal can readily communicate to the destination wireless terminal without causing the congestion on the network.

Embodiment 2

The embodiment 1 of the present invention has described the case of inquiring the position information of the terminal location database via the cellular phone network and the public switched telephone network. The present embodiment describes the case of setting the terminal location database 105 on its own by providing a wireless local area network (or ad hoc network) interface and an address independently. This is made possible by setting the ad hoc network interface to the terminal location database 105B.

The directory access 509 of the wireless terminal 201 has a plurality of communication methods to access the terminal location database 105, 105B, 105C and so forth. These are: the satellite communication; the dedicated short range communication which is the roadside communication mechanism; the ad hoc wireless network communication of the present embodiment; and the cellular phone network communication described in the embodiment 1.

Figure 7:
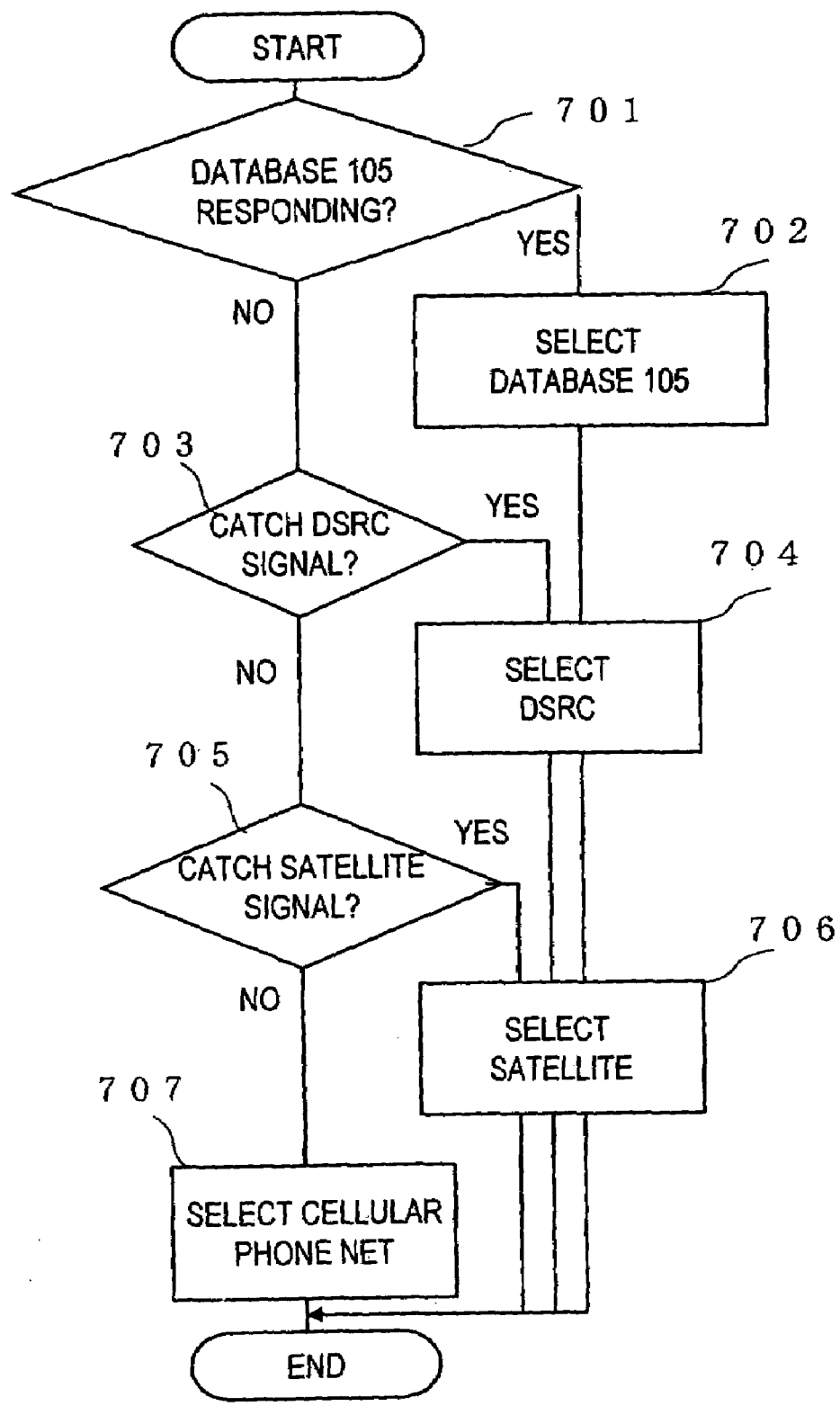
FIG. 7 illustrates an operation of the wireless terminal for the embodiment 2.

The drawing of FIG. 7 illustrates the operation of the wireless terminal 201 for the present embodiment. FIG. 7 shows the priority order for selecting the communication methods to access the terminal location database 105. FIG. 4 A illustrates the software configuration of the terminal location database 105 for the present embodiment.

The operation is described with reference to the drawing of FIG. 1, FIG. 2, FIG. 4 A, FIG. 4 C and FIG. 7.

The directory access 509 of the wireless terminal 201 receives a request for referring and updating the terminal location database from the upper level. Then, according to the flow chart of FIG. 7, the directory access 509 selects the terminal location database, and selects a communication mechanism to access this terminal location database 105. In step 701, the directory access 509 checks whether or not the terminal location database 105 of the present embodiment is connectable. The terminal location database including the database control device 105 has an ad hoc network interface 426 shown in FIG. 4 A. The terminal location database 105 is waiting for the inquiries to come in step 431 of FIG. 4 C. The terminal location database including the database control device 105 detects the inquiries from the wireless terminal 201 in CSMA/CA method. The terminal location database 105 is situated on the ad hoc wireless network and Bluetooth. The terminal location database 105 is securing the media access control address. The directory access 509 can check whether or not the terminal location database 105 is positioned within the communication range of the wireless terminal 201 by attempting to connect to the address of the terminal location database 105. If the directory access 509 detects the terminal location database 105 in the communication range, then in step 702, the terminal location database 105 is set as the connection destination, and the process is completed.

If the directory access 509 of the wireless terminal 201 could not find the terminal location database 105 in the communication range of the wireless terminal 201, then in step 703, the directory access 509 checks whether or not a terminal location database 105C connected to the dedicated short range communication system shown in FIG. 2 is accessible instead.

Meanwhile, the terminal location database 105C connected to the dedicated short range communication system is broadcasting routinely its position by using the broadcast channel. This is described in detail in the next embodiment.

If the directory access 509 receives the broadcast signal emitted by the terminal location database including the database control device 105C during a certain period of time, then in step 704, the directory access 509 registers the dedicated short range communication channel for the accessing channel to the terminal location database 105C, and the process is completed.

However, if the directory access 509 of the wireless terminal 201 fails to catch the signal indicating the position of the terminal location database 105C, then in step 705, the directory access 509 attempts to receive the position signal of the terminal location database 105C from the communication satellite. This is described in detail in the next embodiment. If the reception of the position signal from the satellite is successful, then in step 706, the satellite communication system is registered as accessing channel to the terminal location database 105C, and the process is completed. If the directory access 509 fails to catch the signal from the satellite, then in step 707, the cellular phone network is selected as accessing channel to the terminal location database 105C, and if this is successful, the process is completed. The priority order of selecting the communication media of the present logic is set in considering the communication efficiency obtainable at the available situation. The logic is of course updated according to the improvement of the pre-existing media and emerging of another new and usable media.

Accordingly, in the example of the present embodiment, the terminal location database 105 is to be selected as the first item in the priority order. Based on this information, the direct communication between the wireless terminals in the similar manner as the embodiment 1 becomes possible. Accordingly, since the terminal location databases 105, 105B, and 105C are set at plurality of locations within the range of the ad hoc wireless network, a communication route that does not utilize the wireless base station 103 and the public switched telephone network 102 is secured, which can eventually lower the amount of congestion in the networks. In addition to that, the service is prominently upgraded particularly for the direct communication. Further, the status and resources of the wireless terminals situated in the ad hoc wireless network 106 are controlled.

By the way, in the present embodiment, the terminal location databases 105, 105B, and 105C can be connected to one another. That is, the terminal location database 105 can be connected to the other terminal location databases 105B and 105C. This is possible via the wired network and the public switched telephone network. The data consistency is recovered between these databases on a periodical basis. This periodical updating operation allows the databases to have and to control the most recent information even if a wireless terminal updates its dynamic information on the terminal location database at any one time, the information such as current position, updated directly by the wireless terminal. Or, even if a wireless terminal updates its information in the terminal location database in the public switched telephone network 102, updated via the cellular phone network. This is indicating that the data of the terminal location database 105 is accessed and is updated via the public switched telephone network 102 by using the ad hoc network interface 426 and the wireless base station 103.

The terminal location database 105 also carries out the information service by hyper text transfer protocol in addition to the terminal location database service. The terminal location database 105 prepares the mechanism which is same as the socket emulation mechanism 507. The wireless terminal 201 accesses the hyper text transfer protocol service on the terminal location database 105 through the ad hoc network. For example, the wireless terminal 201 obtains such information as regional information and information obtained from the hyper text transfer protocol service of a wireless terminal visiting the region.

According to the present embodiment, a plurality of terminal location databases are being set in the system of the present invention. Since the position information of the wireless terminals are periodically exchanged between these terminal location databases, the wireless terminal can choose to access the nearest terminal location database, to keep the traffic of the network to a minimum.

Furthermore, the terminal location database of the present invention is provided with the ad hoc wireless network interface. The terminal location database has an independent address. Such that the terminal location database can be connected to the ad hoc wireless network. Since the terminal location database can be set at any location without restrictions, the terminal location database can be set at an appropriate position.

Embodiment 3

The terminal location database access by using the dedicated short range communication is different from the communication methods described so far in the previous embodiments. This is the case of FIG. 1 (B) which skips the inquiring step. In this case, the position information of the wireless terminals are notified by broadcasting.

The communication mechanism by the dedicated short range communication is described with reference to the drawings of FIG. 8 and FIG. 9.

Dedicated short range communication was initially developed as an application for electronic toll collection (ETC) system installed in the toll roads. The dedicated short range communication is the communication mechanism between a vehicle and a roadside communication device. The ability to transfer data from the roadside communication device to the vehicle is relatively larger compared to the other way round. The ability to transfer data from the vehicle side communication device to the roadside communication device therefore is relatively smaller, just sufficient enough to carry out an operation of specifying the vehicle side communication device to the roadside communication device.

The geographical coverage of one dedicated short range communication roadside communication device is about 30 meters in radius of a circle. The present embodiment describes the ad hoc wireless network constructed by the neighboring vehicles. That is, a vehicle wishes to know the positions of all other vehicles in 100 meters range moving in the same direction on the same road.

Figure 8:
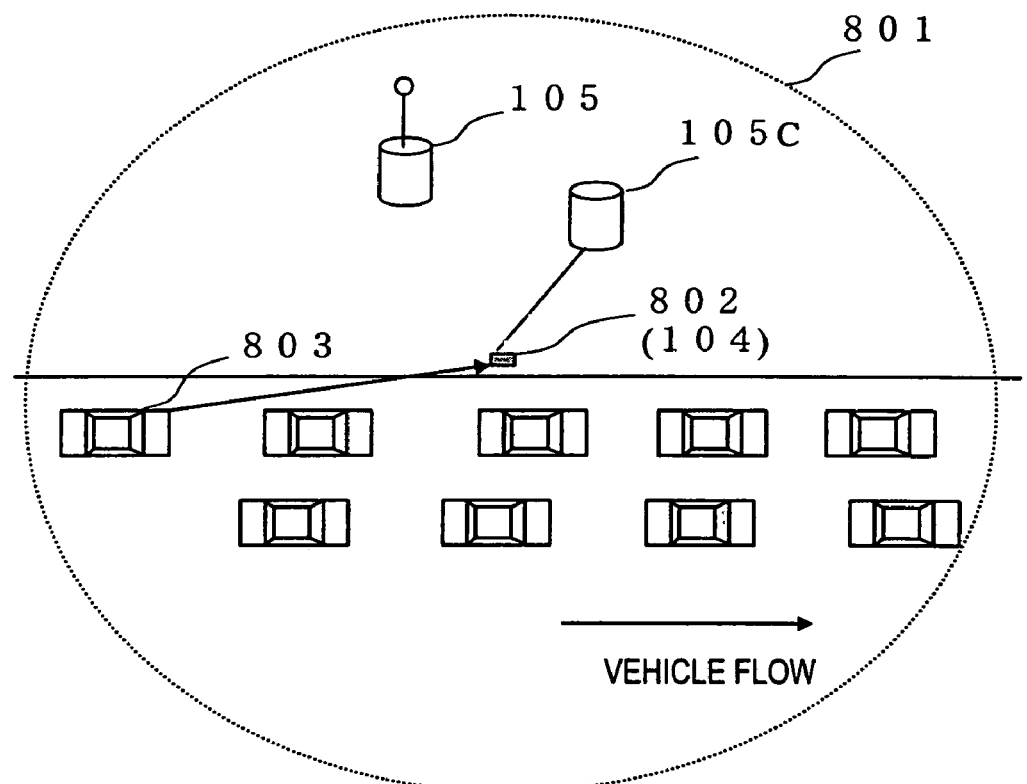
FIG. 8 A illustrates a communication range for the dedicated short range communication of the embodiments 2 and 3.
Figure 8:
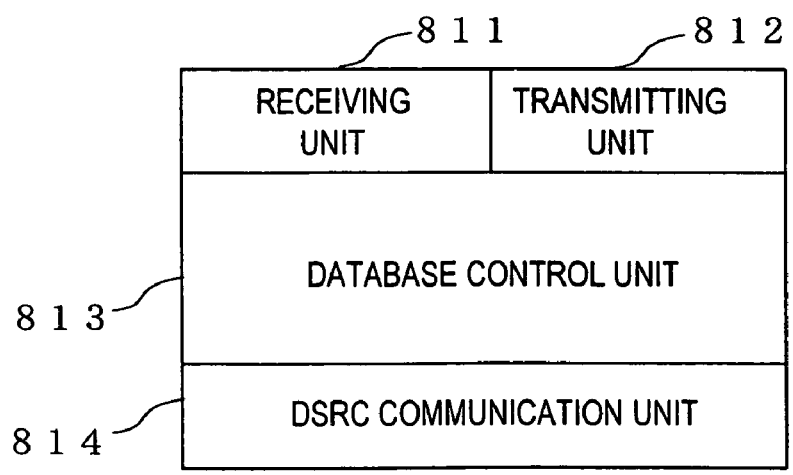
Figure 9:
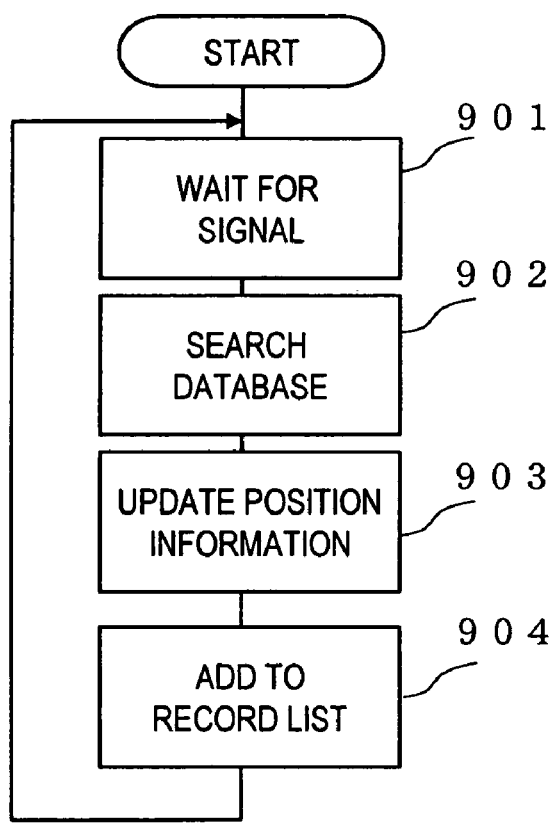
FIG. 9 A illustrates a flow diagram of the roadside communication device of the embodiment 3.
Figure 9:
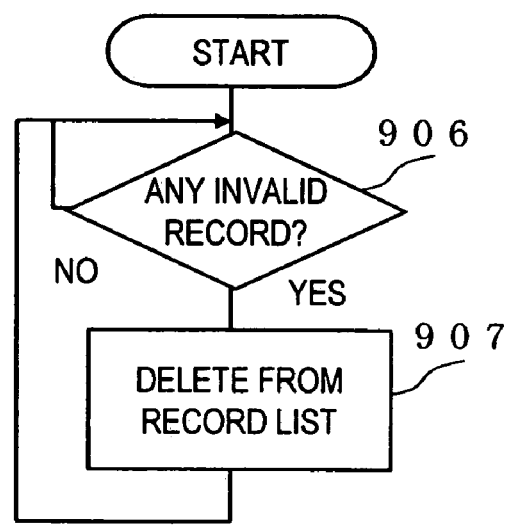

FIG. 8 A illustrates the road example where the dedicated short range communication roadside communication device is being placed. FIG. 8 B illustrates the software configuration of both the roadside communication device 802 (104) and the terminal location database 105C. The reference numeral 802 denotes the roadside communication device. The reference numeral 801 denotes the communication range of the roadside communication device 802. All the vehicles shown in the drawing are in the communication range 801 of the roadside communication device 802. The wireless terminal 803 (corresponds to the wireless terminal 201) enters the communication range 801. The wireless terminal 803 has just transferred its ID information to the roadside communication device 802.

The roadside communication device 802 forms a record list using the terminal records of all the vehicles that are situated within the same communication range. The roadside communication device 802 repeatedly broadcasts this record list. FIG. 9 A illustrates a flow diagram of a vehicle entering the communication range 801. The terminal record of this vehicle is being added to the record list. FIG. 9 B illustrates a flow diagram of a vehicle moving away from the communication range 801. The terminal record of this vehicle is being deleted from the record list since this is no longer valid information.

In step 901, the roadside communication device 802 is waiting for a registration signal to come from a vehicle entering the communication range 801. When the roadside communication device 802 senses the signal that the wireless terminal 803 has entered the communication range 801 and the wireless terminal 803 transmits its ID information to the roadside communication device 802 in step 901. In step 902, in the similar manner as the wireless terminal 201 of the embodiment 1, the roadside communication device 802 inquires to the terminal location database 105C about the wireless terminal 803. In step 903, the terminal location database 105C updates the content of the database control unit 813 of the roadside communication device 802 by providing the dynamic position information of the wireless terminal 803. In step 904, this record is added to the record list for broadcasting.

In step 906, the roadside communication device 802 checks for the no longer valid records in the record list for deleting. Such records are those vehicles that have already moved away from the communication region 801. For example, the validness of the information is determined by using the time lapsed from the record list registration. Those records that have passed a certain period of time from the registration time are determined as invalid. This time period which is the standard for deciding the validness of the information should consider a variation of the time taken in passing the communication region 801 during the congestion of the traffics. In step 907, those records that are determined as invalid are deleted from the record list.

The terminal location database 105C periodically broadcasts the position information of the wireless terminals (as in S10 of FIG. 1 (B)). By doing so, the wireless terminal 803 can readily identify the communication destination wireless terminal. In step S3, the wireless terminal 803 communicates with the destination wireless terminal by forming the ad hoc wireless network.

As described in the example above, the vehicle carrying the wireless terminal 803 in the communication region 801 of the roadside communication device 802 and its record are controlled at the terminal location database 105C as the record list on the roadside communication device 802. The roadside communication device 802 broadcasts the record list according to the step S10 of FIG. 1 (B). Based on this broadcast, the vehicle side communication device, in other words, the wireless terminal 803 can form the ad hoc wireless network among the vehicles. Once this ad hoc wireless network is formed, it is maintained as required.

According to the present embodiment, the terminal location database has a step of broadcasting its position to the wireless terminals. The wireless terminal has a step of inquiring the terminal location database based on the broadcast position, and a step of communicating to the destination wireless terminal based on the broadcast position by skipping the inquiring step. Also, the terminal location database can be set at any location.

Embodiment 4

The previous embodiments have described the methods of obtaining the position information of the wireless terminal by directly inquiring to the terminal location database or by inquiring via the wireless base station using the terminal location database inquiring step. Similar to the broadcasting method of dedicated short range communication, the present embodiment describes a method of informing the position of the terminal location database by broadcasting. The wireless terminal inquires the terminal location database based on the informed position.

According to the present embodiment, the wireless terminal can be connected to the wireless communication route which uses the satellite as a repeater, which is made possible by the media access control such as ALOHA and satellite communication system. Also, the wireless terminal can connect to the terminal location database 105B via this wireless communication route.

In the present embodiment, the communication satellite 101 of FIG. 2 periodically sends the position information of the terminal location database 105B to the wireless communication route as in SLOB of FIG. 1 (C).

The priority order of receiving the position information of the terminal location database by the wireless terminal 201 is illustrated in the flow diagram of FIG. 7. The wireless terminal 201 is positioned in its wireless terminal communication range of the communication satellite 101. If the wireless terminal 201 receives and catches the broadcast step of SLOB from the communication satellite 101 at step 705 of FIG. 7, then the satellite communication is selected in step 706. Next, based on the broadcast information, the wireless terminal 201 inquires the terminal location database 105B specified in the broadcast information at S1B of FIG. 1 (C). The wireless terminal 201 obtains the information regarding the other wireless terminals in the similar manner as the embodiment 1.

Also, the terminal location database 105B which is connected to the satellite base station 109 communicates to the other terminal location databases through a proper and a wired public switched telephone network 102. The terminal location databases performs the recovery of data consistency between them through the proper and wired network such as public switched telephone network 102.

Further on, in the present embodiment, the communication satellite broadcasts a list composed of addresses, access methods and position of the terminal location database 105B as in S10B of FIG. 1(C) during the time period when the satellite is not in use. This allows the wireless terminal receives this information being broadcast and obtains the position of the usable nearby terminal location database 105B. The wireless terminal 201 receives the broadcast information through the global positioning system mechanism 510.

Embodiment 5

The present embodiment describes the case of performing communication by waiting for the other wireless terminal to enter the communication region.

In other words, a wireless terminal 201 makes an appointment to the terminal location database for communicating to the other wireless terminal 202. The wireless terminal 201 begins communication to the wireless terminal 202 after receiving a notification from the terminal location database that the other wireless terminal 202 has entered the ad hoc wireless network. By doing so, this wireless terminal 202 becomes usable as communication destination of the wireless terminal 201 even if the wireless terminal 202 cannot be located in the ad hoc wireless network, by waiting for some period of time.

The system configuration of the present embodiment is similar to the embodiment 1. In the present embodiment, the terminal location database 105B conducts the waiting operation via the wireless base station 103. Alternatively, the terminal location database 105 of the ad hoc wireless network can conduct the waiting operation in the similar manner as the previous embodiments.

Figure 10:
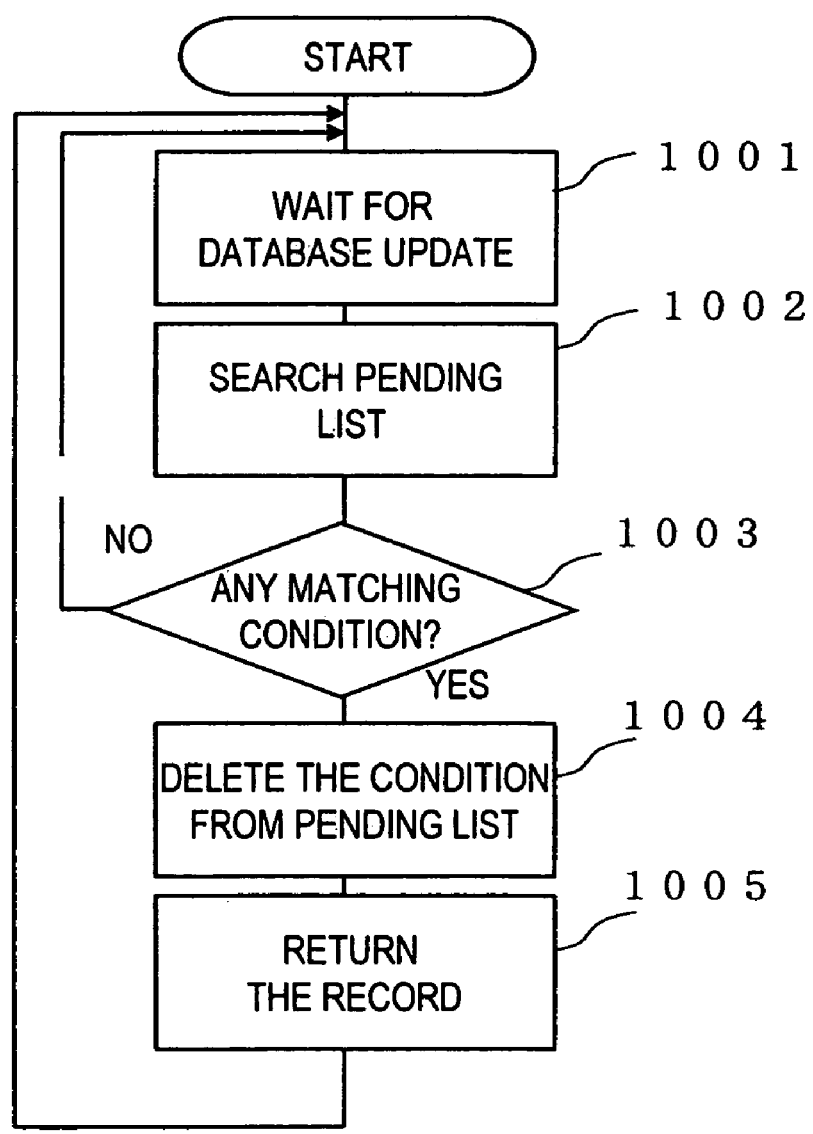
FIG. 10 illustrates a flow diagram of the terminal location database control device for the embodiment 4.

The flow indicating the waiting operation of the terminal location database 105B of this embodiment is described next with reference to the drawing of FIG. 10.

The wireless terminal 201 tries to establish the communication session with the other wireless terminal 202 according to FIG. 6. In the present embodiment, in step 603, the wireless terminal 201 inquires to the terminal location database 105B by attaching a property "pending" not unless the wireless terminal 201 obtains the desired record from the terminal location database 105B. The terminal location database 105B checks this property. The terminal location database 105B searches its records using a search condition expressed below, which includes the node ID information of the wireless terminal 202 and the current position of the wireless terminal 201.

"35.21.2.807N139.32.4.821E;10m;
mobile2.isl.melco.co.jp"

If the terminal location database 105B cannot locate a record that matches with this search condition, then this search condition is registered to the pending list. Later on, the pending list is checked again by the terminal location database 105B based on the operation illustrated in the flow of FIG. 10.

If the wireless terminal 202 changes its position, then it updates the position information record in the terminal location database 105B. In step 1001, the terminal location database 105B waits for the request to update the record of the wireless terminal 202. Then in step 1002, the terminal location database 105B inquires the conditions that are pending after the updating. In step 1003, the terminal location database 105B searches the pending list for a record that matches with the inquired condition that may exists as a result of the updating. For instance, if the data is updated as "the next inquiring condition 'mobile2.isl.melco.co.co.jp' is situated within 10 meters of the inquiring terminal" then the updated record matches the search condition.

In step 1003, the terminal location database 105B finds that matching condition is in the pending list. In step 1004, the terminal location database 105B deletes the matching condition from the pending list. In step 1005, the terminal location database 105B returns the record to the inquiring wireless terminal which is pending.

In other words, the terminal location database 105B replies to the wireless terminal 201 after the condition is met at the replying step S2 of FIG. 1 (A). Of course, this step can be set so that in the case when the position information of the wireless terminal 202 which is the communication destination is not available, the terminal location database 105B can notify the inquiring wireless terminal 201 that the inquiry is pending, and then if the condition is met after a while, the inquiry is replied.

The wireless terminal 201 communicates to the wireless terminal 202 accordingly. The wireless terminal 201 can receive services such as receiving data from the other wireless terminal 202 as described in the embodiment 1. Even if there is no wireless terminal available that matches the search condition upon inquiring to the terminal location database at one time, if the wireless terminal 202 that matches the search condition do came into the ad hoc wireless network, the terminal location database 105B is updated accordingly, and the terminal location database 105B notifies the wireless terminal 201 that the wireless terminal 202 which matches the condition did came into the ad hoc wireless network 106.

According to the present embodiment, the terminal location database has a step of keeping the reply to the inquiry if the destination wireless terminal is not located in the desired position at any one time. Then, the step replies the position information of the destination wireless terminal if it enters the desired position. This step brings about the effect of increasing the chance of communication.

Embodiment 6

The present embodiment further describes a system in which the other wireless terminals mediate the communication between the two wireless terminals in the case that the two wireless terminals cannot directly communicate with one another.

FIG. 3 illustrates how this mediation takes place for the present embodiment. The wireless terminals 202 and 203 receive a request for mediation from the terminal location databases 105B and 105 according to the initializing step S4 of FIG. 1 (D). The wireless terminal 201 can communicate to the wireless terminal 204 via the wireless terminals 202 and 203. In other words, the wireless terminals 201 and 204 form the ad hoc wireless network via the communication region 206.

The operation is described with reference to FIG. 11 which illustrates a flow of the terminal location database in operation. FIG. 12 illustrates the route information to be transmitted from the wireless terminal 201 to the intermediate wireless terminal(s).

In the similar manner as the embodiment 1, the wireless terminal 201 specifies its current position, the communication possible distance, and the node ID information of the wireless terminal 204 (destination wireless terminal), and a permitted hop number. The wireless terminal 201 inquires the terminal location databases 105B and 105 according to the inquiring step S603 of FIG. 6.

The terminal location database searches for the intermediate terminals and creates the route information (route list). In specific terms, in step S1101, the terminal location database searches the node ID information 401 of the intermediate terminal. Further, the terminal location database checks whether or not the intermediate terminal which is detected as a result of the search is active. If it is not active, then the terminal location database reports an error to the inquiring wireless terminal in step S1102.

If the intermediate terminal is active, then in step S1104, the terminal location database checks whether or not the inquiring wireless terminal 201 and the intermediate wireless terminal are communication possible based on the communication possible distance given. If the communication is not possible at the given distance, then in step S1105, the terminal location database checks whether the permitted hop number (the number of intermediate terminals) is exceeding or not, and if it is being exceeded, then the error is reported in step S1102 to terminate the operation.

If the number of intermediate terminals to be set are within the specified hop number, then in step 1106, the terminal location database selects the intermediate terminal among from all the terminals having a repeater function situated in the communication region 206, which is located closest to the current position of the wireless terminal 204. Those terminals that have the repeater function displays "repon" at the third columns (410, 411) of FIG. 4. Further in step 1107, the selected intermediate terminal is registered to the route list and add "1" to the hop number.

Again, in step 1104, the terminal location database checks whether or not the selected intermediate terminal in step 1106 can reach the wireless terminal 204. If that is possible, then in step 1103, the terminal location database returns the route list comprised of a record of the wireless terminal 204 and a record of the intermediate terminal to the inquiring wireless terminal 201. The wireless terminal 201 which has received this route list forms a route information table of FIG. 12 in order to set up the route information to, for example, the intermediate terminals 202 and 203.

In FIG. 12, the reference numeral 1201 denotes an address and node ID information of the wireless terminal 201. The reference numeral 1202 denotes an address and the node ID information of the first intermediate terminal 202. The reference numeral 1203 denotes an address and node ID information of the second intermediate terminal 203. The reference numeral 1204 denotes an address and node ID information of the wireless terminal 204. In this example, the number of the intermediate terminals, in other words, the hop number is "2". The wireless terminal 201 transmits the route information table to the intermediate terminal 202. The intermediate terminal 202 searches the route list to confirm the address and the node ID information of the wireless terminal 201 and the addresses 1201 and 1204, and finds out that itself is the first one of the intermediate terminals as indicated in 1202.

When the intermediate terminal 202 receives the data to the wireless terminal 204, then transfers the data to the specified intermediate terminal 203. The intermediate terminal 202 sets up a repeater for transferring the data to the wireless terminal 201, receiving the data to the wireless terminal 201 and the wireless terminal 202 transmits the route information table to the next intermediate terminal 203. The intermediate terminal 203 receives the route information table, then knows itself as the second intermediate terminal in the similar manner as the intermediate terminal 202. The intermediate terminal 203 sets up the repeater to transfer the data to the wireless terminal 204 when the terminal receives the data to the wireless terminal 204. The intermediate terminal 203 transfers the data to the wireless terminal 202 when the terminal receives the data to the wireless terminal 201. The intermediate terminal 203 transmits the route information table to the next terminal which is the wireless terminal 204. The wireless terminal 204 sets up the route so that the transmission of the data to the wireless terminal 201 is transmitted to the intermediate terminal 203.

By setting the route information accordingly, the wireless terminal 201 can communicate with the wireless terminal 204 which is situated beyond the communication region 205.

Instead of the wireless terminal 201 forming the route information and transmitting it to the intermediate terminal 202, the terminal location database can form the route information, and it can be passed onto the intermediate terminal at the initializing step S4 of FIG. 1 (D).

In other words, the wireless terminal 201 inquires to the terminal location database 105B or 105C (see step S1 of FIG. 1) by attaching a property of requesting the route information set up. The hop number is also added to this request.

Figure 11:
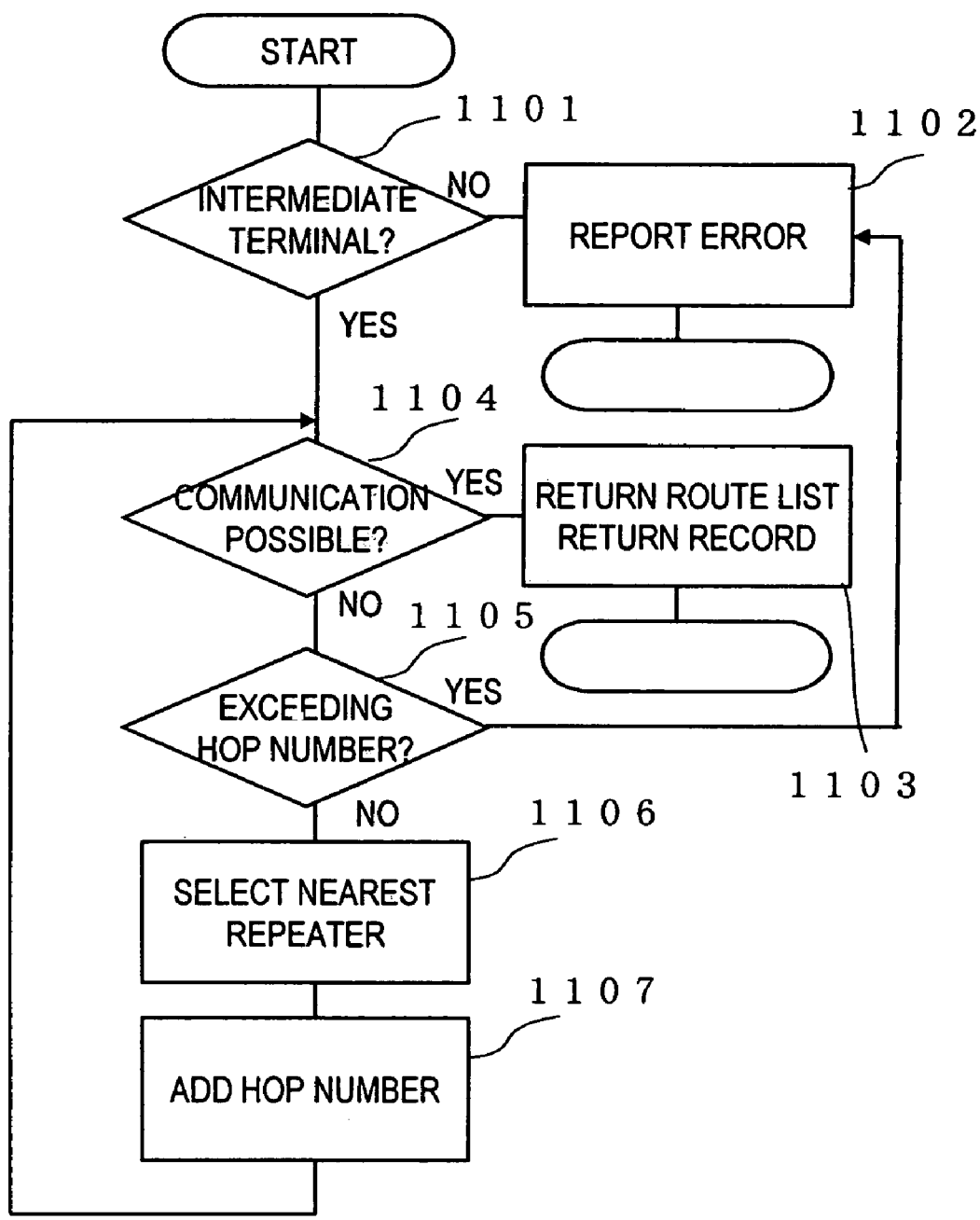
FIG. 11 illustrates a flow diagram of the terminal location database for the embodiment 5.

The terminal location database 105B or 105C perform the process of setting the route information to the intermediate terminals according to the flow of FIG. 11. In step 1103, the terminal location database 105B sets up the route information to the intermediate terminals instead of returning the route list to the wireless terminal 201. The route list is returned to the wireless terminal 201 via the cellular phone network. The terminal location database 105B executes the initializing step S4 of FIG. 1. When the route information are successfully set up to all of the intermediate terminals 202 and 203, then the terminal location database 105B returns the record to the wireless terminal 201 who requested the route information set up. If the route information cannot be set up to all of the intermediate terminals, then the route information is deleted, and in step S1102 report an error.

If the wireless terminal 201 receives a record of the destination wireless terminal 204, from the terminal location database 105B or 105C, since the route information are already being set in this example, the wireless terminal 201 sets up its route information to carry out communication to the wireless terminal 204 via the intermediate terminals 202 and 203, such that the communication becomes possible via the intermediate terminals 202 and 203.

According to the present embodiment, the terminal location database has a step of searching for the intermediate terminals between the inquiring wireless terminal and the destination wireless terminal. Then, this step replies to the inquiring wireless terminal including the name of the intermediate terminals. If needed, the step also carries out setting up the route information to the intermediate terminals. This step brings about the effect of expanding the communication region.

Embodiment 7

The present embodiment describes a collaborative operation of the terminal location database 105B with the home location register which is utilized in the cellular phone network. In other words, the present embodiment describes a system that makes use of the position information of the home location register.

Figure 13:
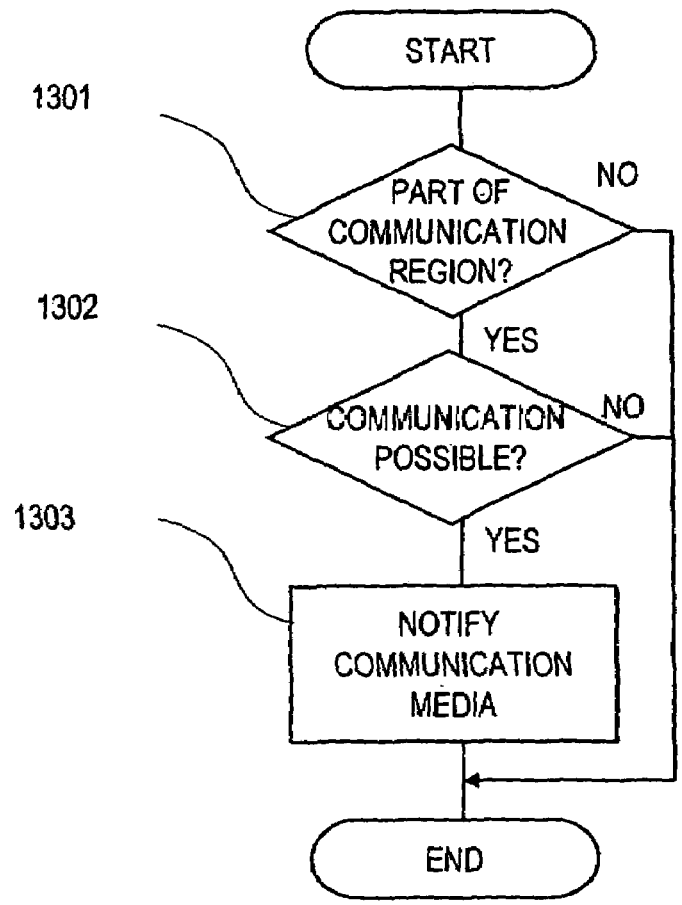
FIG. 13 A illustrates an example of the terminal location database.

The home location register 115 of FIG. 2 in the system of the present embodiment carries out a position control of the wireless terminals. FIG. 13 A describes the content of how the home location register controls the position information of the wireless terminals. The home location register 115 controls the position of the wireless terminals having the telephone numbers 1311 entering each cell in the system by attaching the cell ID 1312. Also, FIG. 13 B is the flow of how the terminal location database including the database control device controls the wireless terminal entering a cell.

The operation is described next.

The wireless terminal 201 enters the system where the home location register 115 is being set up. The home location register 115 responds to the call made by the wireless terminal 201 and registers the position of the wireless terminal 201 as indicated in FIG. 13 A. The home location register lets the terminal location database 105B to deal with this registration. The terminal location database including the database control device 105B performs the operation indicated in FIG. 13 B. In specific terms, in step 1301, the terminal location database including the database control device checks whether or not the communication destination wireless terminal belongs to the communication region specified by the communication system. If the communication destination wireless terminal is outside the region, the process completes without doing anything. In step 1302, the terminal location database 105B uses the telephone numbers 1311 of the wireless terminal 201 and the communication destination wireless terminal as keys to search the terminal location database 105B to obtain their records, checks the operation status of both wireless terminals, and checks if the communication media possessed by both wireless terminals are same or not, and if not the process completes without doing anything.

If the ideal communication media is found to be possessed by both wireless terminals, then in step 1303, the terminal location database including the database control device 105B notifies to the wireless terminal 201 that this communication media is applicable while holding onto the call. At the same time, the terminal location database 105B also notifies the cell ID 1312 of FIG. 13 A. Then, the terminal location database 105B waits for some period of time before hanging up the call until the wireless terminal 201 is notified. This calling process continues on if the call is not hang up.

Accordingly, by referring to the home location register, the terminal location database can notify the communication media which is inexpensive and has a good transferring function to the wireless terminal, so that the ideal communication method is selected by the wireless terminal.

The service information of the terminal location database can be subdivided, for example, let it have a regional characteristic. What is meant by the regional characteristic of the service information is that the service information other than the position information of the wireless terminals are divided based on their region and they are controlled separately. This is of course applicable to any one of the previously described embodiments. If there is a regional characteristic information available in the other terminal location database 105 in respect to the inquiry S1 from a wireless terminal, the inquired terminal location database 105B replies the address of the terminal location database 105 to the inquiring wireless terminal. Based on the reply S2 from the terminal location database 105B, the wireless terminal inquires to the terminal location database 105 which is indicated in the reply from the terminal location database 105B. This way, the role of the terminal location databases becomes more elaborate in terms of the services they provide.

According to the present embodiment, the terminal location database has a step of notifying the relevant information of the other terminal location database. This step enables the wireless terminal to obtain more detailed information.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wireless terminal communication method in a network, the network comprising, a plurality of wireless terminals, and a terminal location database for controlling position information of the wireless terminals, the wireless terminal communication method comprises the steps of:

sending an inquiry to the terminal location database by a mobile wireless terminal for position information of a destination mobile wireless terminal of the mobile wireless terminal;

sending communications transmissions to the destination mobile wireless terminal from the mobile wireless terminal to share data between the mobile wireless terminal and the destination mobile wireless terminal when the mobile wireless terminal has received the position information of the destination mobile wireless terminal from the terminal location database;

exchanging periodically the position information of the wireless terminals by the terminal location database;

notifying to an other terminal location database who can respond to the inquiry after the terminal location database receives an inquiry regarding a relevant information from the wireless terminal; and wherein the wireless terminal makes an inquiry to the other terminal location database based on this notification of the position of the other terminal location database.

2. The wireless terminal communication method as defined in claim 1, wherein the terminal location database replies pending to the inquiring step to the terminal location database by the wireless terminal unless the destination wireless terminal is registered; and wherein the terminal location database replies to the inquire after the destination wireless terminal enters and registers the desired position.

3. The wireless terminal communication method as defined in claim 1, wherein the wireless terminal determines a priority order of the inquiries, and sends the inquiring step according to the priority order.

4. The wireless terminal communication method as defined in claim 1, wherein the terminal location database has an address and an ad hoc wireless network interface, and connects to the ad hoc wireless network.

5. The wireless terminal communication method as defined in claim 1, wherein the terminal location database refers and replies to the inquiring step the position information of the wireless terminals controlled by the cellular phone network.

6. The method of claim 1, wherein said communicating reduces congestion in the network.

7. The method of claim 1, wherein said inquiring includes inquiring to the terminal location database via a roadside communication device wherein said mobile wireless terminal being co-located with a first vehicle and said destination mobile wireless terminal being co-located with a second vehicle.

8. A wireless terminal communication method in a network, the network comprising, a plurality of wireless terminals, and a terminal location database for controlling position information of the wireless terminals, the wireless terminal communication method comprises the steps of:

inquiring to the terminal location database by a wireless terminal for a position information of a destination wireless terminal of the wireless terminal;

communicating with the destination wireless terminal to share data between the wireless terminal and the destination wireless terminal when the wireless terminal has received the position information of the destination wireless terminal from the terminal location database;

broadcasting periodically a position and address of the terminal location database by the terminal location database; and wherein the wireless terminal makes an inquiry to the terminal location database based on the broadcast position and address.

9. A wireless terminal communication method in a network, the network comprising, a plurality of wireless terminals, and a terminal location database for controlling position information of the wireless terminals, the wireless communication method comprises the steps of:

broadcasting periodically a position and address of the terminal location database by the terminal location database; and communicating from a wireless terminal to a destination wireless terminal to share data between the wireless terminal and the destination wireless terminal based on the broadcast position and address wherein the terminal location database is a separate wirelessly communicating entity than the wireless terminal and the destination wireless terminal.

10. A wireless terminal communication method in a network, the network comprising, a plurality of wireless terminals, and a terminal location database for controlling the position information of the wireless terminals, the wireless terminal communication method comprises the steps of:

inquiring to the terminal location database by a wireless terminal for a position information of a destination wireless terminal of the wireless terminal; and communicating with the destination wireless terminal when the wireless terminal has received the position information of the destination wireless terminal from the terminal location database, wherein the terminal location database searches for an intermediate terminal to the inquiring step unless the direct communication between the wireless terminal and the destination wireless terminal is possible, and replies to the inquiring step to the terminal location database including the name of the searched intermediate terminals to the wireless terminal.

11. The wireless terminal communication method as defined in claim 10, wherein the terminal location database sets up a route information; and further comprising;

sending the route information to the intermediate terminals.

12. A wireless communication system using a network of a plurality of wireless terminals, comprising:

a terminal location database to control position information of the plurality of wireless terminals;

a mobile wireless terminal to inquire the terminal location database for the position information of a destination mobile wireless terminal; and a communication control mechanism on the wireless terminal to control direct communication between the wireless terminal and the destination wireless terminal based on the position information of the destination mobile wireless terminal provided by the terminal location database, wherein the terminal location database periodically broadcasts a position and address of the terminal location database, wherein the terminal location database is a separate wirelessly communicating entity than the wireless terminal and the destination wireless terminal.

13. The wireless communication system of claim 12, further comprising an intermediate terminal to facilitate communication between the wireless terminal and the destination wireless terminal.

14. A wireless communication system using a network of a plurality of wireless terminals, comprising:

a terminal location database to control position information of the plurality of wireless terminals;

a wireless terminal to inquire the terminal location database for the position information of a destination wireless terminal; and a communication control mechanism on the wireless terminal to control direct communication between the wireless terminal and the destination wireless terminal based on the position information of the destination wireless terminal provided by the terminal location database;

wherein the terminal location database periodically broadcasts a position and address of the terminal location database, wherein the terminal location database is a separate wirelessly communicating entity than the wireless terminal and the destination wireless terminal.

15. A wireless terminal communication method in a network, the network comprising, a plurality of wireless terminals, and a terminal location database for controlling position information of the wireless terminals, the wireless terminal communication method comprises:

receiving an inquiry at the terminal location database sent from a mobile wireless terminal for position information of a destination mobile wireless terminal of the mobile wireless terminal;

sending the position information of the destination mobile wireless terminal to the mobile wireless terminal, from the terminal location database, to generate communications transmissions to the destination mobile wireless terminal from the mobile wireless terminal to share data between the mobile wireless terminal and the destination mobile wireless terminal;

exchanging periodically the position information of the wireless terminals by the terminal location database;

notifying to an other terminal location database who can respond to the inquiry after the terminal location database receives an inquiry regarding a relevant information from the wireless terminal; and wherein the wireless terminal makes an inquiry to the other terminal location database based on this notification of the position of the other terminal location database.

16. A wireless terminal communication method in a network, the network comprising, a plurality of wireless terminals, and a terminal location database for controlling position information of the wireless terminals, the wireless terminal communication method comprises the steps of:

sending an inquiry to the terminal location database by a mobile wireless terminal for position information of a destination mobile wireless terminal of the mobile wireless terminal; and sending communications transmissions to the destination mobile wireless terminal from the mobile wireless terminal to share data between the mobile wireless terminal and the destination mobile wireless terminal when the mobile wireless terminal has received the position information of the destination mobile wireless terminal from the terminal location database;

wherein the terminal location database replies pending to the inquiring step to the terminal location database by the wireless terminal unless the destination wireless terminal is registered; and wherein the terminal location database replies to the inquire after the destination wireless terminal enters and registers the desired position, wherein the terminal location database periodically broadcasts a position and address of the terminal location database, wherein the terminal location database is a separate wirelessly communicating entity than the wireless terminal and the destination wireless terminal.

17. A wireless terminal communication method in a network, the network comprising, a plurality of wireless terminals, and a terminal location database for controlling position information of the wireless terminals, the wireless terminal communication method comprises:

receiving an inquiry at the terminal location database sent from a mobile wireless terminal for position information of a destination mobile wireless terminal of the mobile wireless terminal; and sending the position information of the destination mobile wireless terminal to the mobile wireless terminal, from the terminal location database, to generate communications transmissions to the destination mobile wireless terminal from the mobile wireless terminal to share data between the mobile wireless terminal and the destination mobile wireless terminal;

wherein the terminal location database replies pending to the inquiring step to the terminal location database by the wireless terminal unless the destination wireless terminal is registered; and wherein the terminal location database replies to the inquire after the destination wireless terminal enters and registers the desired position wherein the terminal location database periodically broadcasts a position and address of the terminal location database, wherein the terminal location database is a separate wirelessly communicating entity than the wireless terminal and the destination wireless terminal.

* * * * *